(12) United States Patent
Yamaguchi et al.

(10) Patent No.: US 12,246,695 B2
(45) Date of Patent: Mar. 11, 2025

(54) CONTROLLER FOR HYBRID ELECTRIC VEHICLE

(71) Applicant: TOYOTA JIDOSHA KABUSHIKI KAISHA, Toyota (JP)

(72) Inventors: Mitsuru Yamaguchi, Ama (JP); Masayuki Baba, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 215 days.

(21) Appl. No.: 17/984,341

(22) Filed: Nov. 10, 2022

(65) Prior Publication Data
US 2023/0242088 A1    Aug. 3, 2023

(30) Foreign Application Priority Data

Jan. 28, 2022   (JP) .................................. 2022-012307

(51) Int. Cl.
*B60W 20/10*   (2016.01)
*B60K 6/40*   (2007.10)

(52) U.S. Cl.
CPC .............. *B60W 20/10* (2013.01); *B60K 6/40* (2013.01); *B60W 2510/1005* (2013.01); *B60W 2510/1015* (2013.01); *B60W 2710/1011* (2013.01); *B60Y 2200/92* (2013.01)

(58) Field of Classification Search
CPC ......... B60W 20/10; B60W 2510/1005; B60W 2510/1015; B60W 2710/1011; B60K 6/40; B60Y 2200/92
See application file for complete search history.

(56) References Cited

U.S. PATENT DOCUMENTS

| 10,232,698 | B2 * | 3/2019 | Miyagawa | ............ B60W 10/10 |
| 2013/0046429 | A1 * | 2/2013 | Tashiro | ................. B60W 10/08 180/65.265 |
| 2016/0031438 | A1 | 2/2016 | Matsui et al. | |
| 2017/0050630 | A1 * | 2/2017 | Park | ..................... B60W 10/06 |

FOREIGN PATENT DOCUMENTS

| JP | 2000-038939 A | 2/2000 |
| JP | 2000-179671 A | 6/2000 |
| JP | 2012-081875 A | 4/2012 |
| WO | 2014/162839 A1 | 10/2014 |

* cited by examiner

*Primary Examiner* — Joan T Goodbody
*Assistant Examiner* — Godfrey Aleksander Maciorowski
(74) *Attorney, Agent, or Firm* — Dinsmore & Shohl LLP

(57) ABSTRACT

During BEV running that a vehicle is caused to run by using power of an electric motor, a determination threshold for determining whether to start an engine is corrected by estimating a shortage of driving force in advance based on a gear stage of an automatic transmission and a turbine rotation speed (that is, an AT input shaft rotation speed of the automatic transmission). Therefore, the engine is started at appropriate timing for a change in required MG torque, with the result that the shortage of driving force of the vehicle is suppressed.

4 Claims, 3 Drawing Sheets

A # CONTROLLER FOR HYBRID ELECTRIC VEHICLE

CROSS-REFERENCE TO RELATED APPLICATION

This application claims priority to Japanese Patent Application No. 2022-012307 filed on Jan. 28, 2022, incorporated herein by reference in its entirety.

BACKGROUND

1. Technical Field

The disclosure relates to a controller for a hybrid electric vehicle that uses an engine and an electric motor as driving force sources.

2. Description of Related Art

Japanese Unexamined Patent Application Publication No. 2000-038939 (JP 2000-038939 A) describes that, in a stopped state before the start of a vehicle, a specific state where a running load at the time of the start of the vehicle is greater than or equal to a predetermined value is detected, and, when the specific state has been detected, an engine is started beforehand in preparation for the start of the vehicle, with the result that the vehicle is smoothly accelerated without the slow response of the vehicle at the start. The specific state is determined based on, for example, the hill-climbing angle of an uphill road, an air conditioner load, and the loaded weight of the vehicle.

SUMMARY

Incidentally, in JP 2000-038939 A, only the start of the vehicle from a stopped state is taken into consideration, and the technology is not applied at the time of, for example, acceleration from an extremely low vehicle speed state. In this case, determination to start the engine from motor running delays. As a result, backward movement or slow response of acceleration of the vehicle due to a shortage of driving force of the vehicle can occur.

The disclosure provides a controller for a hybrid electric vehicle that includes a driving force source made up of an engine and an electric motor and a transmission to which power is transmitted from the driving force source, the controller being capable of suppressing a shortage of driving force by starting the engine at appropriate timing in starting the engine from motor running.

A first aspect of the disclosure relates to a controller for a hybrid electric vehicle that includes an engine and an electric motor functioning as a driving force source for propelling the hybrid electric vehicle, and a transmission inserted in a driveline between a drive wheel and each of the engine and the electric motor. The controller includes a control unit configured to start the engine when a required torque of the electric motor becomes greater than a preset determination threshold during motor running that the hybrid electric vehicle is caused to run by using power output from the electric motor. The determination threshold is configured to be corrected based on a gear stage of the transmission and an input shaft rotation speed of an input shaft of the transmission or a value related to the input shaft rotation speed.

In the above aspect, the determination threshold may be corrected when the gear stage is a gear stage other than a gear stage with a largest gear ratio of the transmission.

In the above aspect, the determination threshold may be corrected so as to reduce as the input shaft rotation speed of the transmission or the value related to the input shaft rotation speed reduces.

In the above aspect, the determination threshold may be corrected so as to reduce as the gear stage of the transmission increases as compared to when the gear stage is low.

According to the above aspect, the determination threshold for determining whether to start the engine is corrected by estimating a shortage of driving force in advance based on the gear stage of the transmission and the input shaft rotation speed of the transmission during motor running that the vehicle is caused to run by using the power of the electric motor. Therefore, the engine is started at appropriate timing for a change in required torque of the electric motor, with the result that the shortage of driving force of the vehicle is suppressed. As a result, backward movement or slow response of acceleration of the vehicle due to a shortage of driving force of the vehicle is suppressed.

According to the above aspect, the determination threshold is corrected when the gear stage is a gear stage other than a gear stage with a largest gear ratio of the transmission. Therefore, occurrence of a shortage of driving force in a gear stage with a smaller gear ratio than the gear stage with the largest gear ratio is estimated in advance, and the engine is started at appropriate timing, with the result that a shortage of driving force is suppressed.

According to the above aspect, the determination threshold is corrected so as to reduce as the input shaft rotation speed of the transmission reduces. Therefore, for a situation in which a shortage of driving force tends to occur as the input shaft rotation speed of the transmission reduces, the engine is more easily started early, with the result that a shortage of driving force is suppressed.

According to the above aspect, the determination threshold is corrected so as to reduce as the gear stage of the transmission increases as compared to when the gear stage is low. Therefore, for a situation in which a shortage of driving force tends to occur as the gear stage increases, the engine is more easily started early, with the result that a shortage of driving force is suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the disclosure will be described in detail with reference to the accompanying drawings. In the following embodiment, drawings are simplified or deformed where appropriate, and the scale ratio, shape, and the like of each component are not always drawn accurately.

Figure 1:
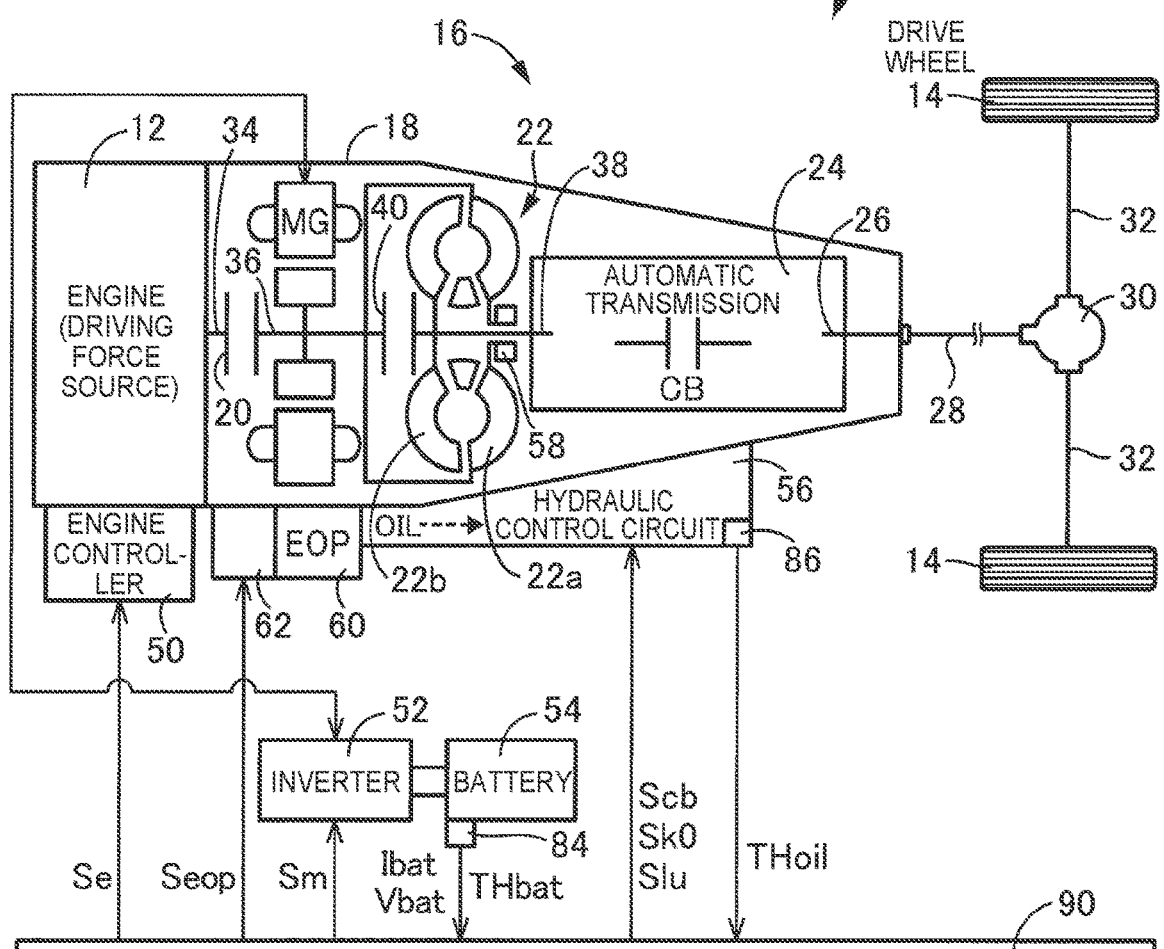
FIG. 1 is a diagram that illustrates the schematic configuration of a hybrid electric vehicle to which the disclosure is applied and is a diagram that illustrates a relevant part of control functions and control system for various control in the vehicle.
Figure 1:
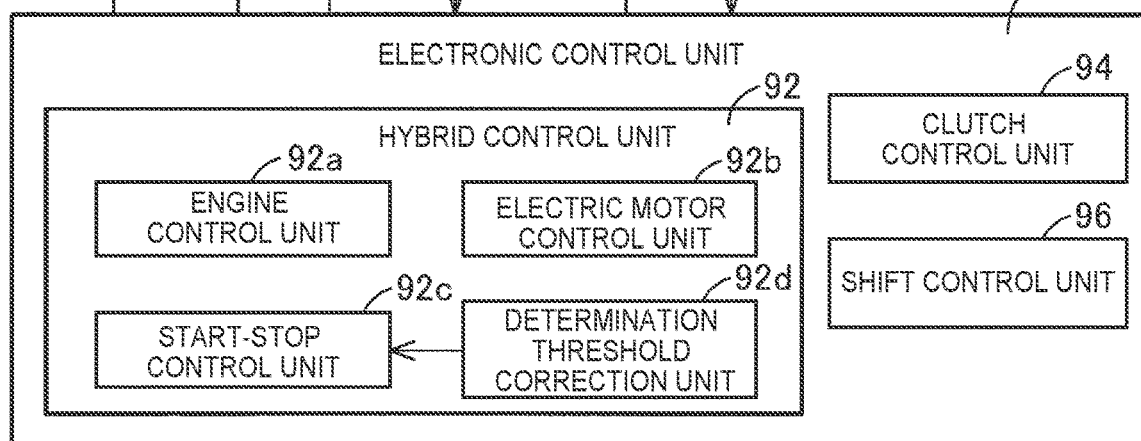
Figure 1:
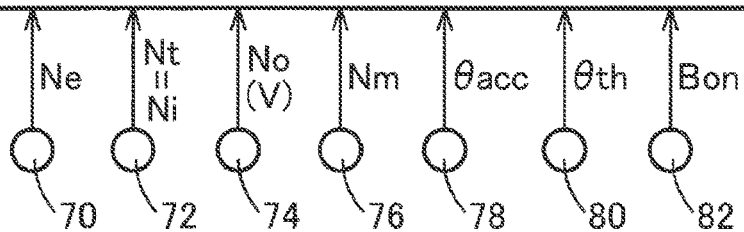

FIG. 1 is a diagram that illustrates the schematic configuration of a hybrid electric vehicle 10 (hereinafter, vehicle 10) to which the disclosure is applied and is a diagram that illustrates a relevant part of control functions and control system for various control in the vehicle 10. As shown in FIG. 1, the vehicle 10 is a hybrid electric vehicle including an engine 12 and an electric motor MG that function as a driving force source for propelling the vehicle 10. The vehicle 10 includes a powertrain 16 provided in a driveline between each of the engine 12 and the electric motor MG and a pair of drive wheels 14.

The engine 12 is a known internal combustion engine, such as a gasoline engine and a diesel engine. In the engine 12, an electronic control unit 90 (described later) controls an engine controller 50 to control an engine torque Te that is an output torque of the engine 12. The engine controller 50 includes a throttle actuator, a fuel injection device, an ignition device, and the like provided in the vehicle 10.

The electric motor MG is a motor generator that has the function of a motor to generate mechanical power from electric power and the function of a generator to generate electric power from mechanical power. The electric motor MG is connected to a battery 54 via an inverter 52. The inverter 52 and the battery 54 are provided in the vehicle 10. When the inverter 52 is controlled by the electronic control unit 90 (described later), an MG torque Tm that is the output torque of the electric motor MG is controlled. When, for example, the rotation direction of the electric motor MG is a forward rotation direction that is the same rotation direction as that during operation of the engine 12, the MG torque Tm is a power running torque for a positive torque on an accelerating side and is a regenerative torque for a negative torque on a decelerating side. The electric motor MG generates power for propelling the vehicle 10 by using electric power supplied from the battery 54 via the inverter 52 instead of the engine 12 or in addition to the engine 12. The electric motor MG generates electric power by using the power of the engine 12 or driven force input from the drive wheels 14. Electric power generated by power generation of the electric motor MG is stored in the battery 54 via the inverter 52. The battery 54 is an electrical storage device that exchanges electric power with the electric motor MG. The electric power is synonymous with electric energy unless otherwise distinguished. The power is synonymous with torque and force unless otherwise distinguished.

The powertrain 16 includes a K0 clutch 20, a torque converter 22, an automatic transmission 24, and the like in a case 18 that is a non-rotating member secured to a vehicle body. The K0 clutch 20 is a hydraulic friction engagement device provided between the engine 12 and the electric motor MG in the driveline between the engine 12 and the drive wheels 14. The torque converter 22 is connected to the engine 12 via the K0 clutch 20.

The automatic transmission 24 is connected to the torque converter 22 and is inserted in the driveline between each of the engine 12 and the electric motor MG and the pair of drive wheels 14. In other words, the torque converter 22 and the automatic transmission 24 each make up part of the driveline between each of the engine 12 and the electric motor MG and the pair of drive wheels 14. The powertrain 16 includes a propeller shaft 28, a differential gear 30, a pair of drive shafts 32, and other parts. The propeller shaft 28 is coupled to a transmission output shaft 26 that is an output rotating member of the automatic transmission 24. The differential gear 30 is coupled to the propeller shaft 28. The drive shafts 32 are coupled to the differential gear 30. The powertrain 16 includes an engine coupling shaft 34 and an electric motor coupling shaft 36. The engine coupling shaft 34 couples the engine 12 to the K0 clutch 20. The electric motor coupling shaft 36 couples the K0 clutch 20 to the torque converter 22.

The electric motor MG is coupled to the electric motor coupling shaft 36 in the case 18 such that power can be transmitted. The electric motor MG is coupled to the driveline between the engine 12 and the pair of drive wheels 14, particularly, the driveline between the K0 clutch 20 and the torque converter 22, such that power can be transmitted. In other words, the electric motor MG is connected to the torque converter 22 and the automatic transmission 24 such that power can be transmitted, without intervening the K0 clutch 20. From another viewpoint, the torque converter 22 and the automatic transmission 24 each make up part of the driveline between the electric motor MG and the pair of drive wheels 14. The torque converter 22 and the automatic transmission 24 each transmit driving force from each of the engine 12 and the electric motor MG to the drive wheels 14.

The torque converter 22 includes a pump impeller $22a$ coupled to the electric motor coupling shaft 36 and a turbine runner $22b$ coupled to a transmission input shaft 38 (an input shaft of a transmission in the disclosure) that is an input rotating member of the automatic transmission 24. The pump impeller $22a$ is coupled to the engine 12 via the K0 clutch 20 and is directly coupled to the electric motor MG. The pump impeller $22a$ is an input rotating member of the torque converter 22. The turbine runner $22b$ is an output rotating member of the torque converter 22. The electric motor coupling shaft 36 is also the input rotating member of the torque converter 22. The transmission input shaft 38 is also the output rotating member of the torque converter 22, formed integrally with a turbine shaft driven for rotation by the turbine runner $22b$. The torque converter 22 is a fluid transmission device that transmits driving force from each of the driving force sources (the engine 12 and the electric motor MG) to the transmission input shaft 38 via fluid. The torque converter 22 includes a lockup clutch 40 (hereinafter, LU clutch 40) that couples the pump impeller $22a$ to the turbine runner $22b$. The LU clutch 40 is a known disconnect clutch that connects or disconnects the input and output rotating members of the torque converter 22.

An LU clutch torque Tlu that is the torque capacity of the LU clutch 40 is changed by a regulated LU hydraulic pressure PRlu supplied from a hydraulic control circuit 56 provided in the vehicle 10. Thus, the operation status, that is, the controlled status, of the LU clutch 40 is changed. The controlled status of the LU clutch 40 includes a completely released state that is a state where the LU clutch 40 is released, a slip state that is a state where the LU clutch 40 is engaged with a slip, and a completely engaged state that is a state where the LU clutch 40 is engaged.

The automatic transmission 24 is, for example, a known planetary gear automatic transmission that includes, for example, a set or multiples sets of planetary gear trains (not shown) and a plurality of engagement devices CB. Each of the engagement devices CB is, for example, a hydraulic friction engagement device that is a multiple disc or single disc clutch or brake that is pressed by a hydraulic actuator, a band brake that is fastened by a hydraulic actuator, or the like. The controlled status, such as an engaged state and a released state, of each of the engagement devices CB is changed by changing a CB torque Tcb that is the torque capacity of each of the engagement devices CB by using a regulated CB hydraulic pressure PRcb supplied from the hydraulic control circuit 56. The automatic transmission 24 may be regarded as a transmission of the disclosure.

The automatic transmission 24 is a step transmission in which any one of multiple gear stages (also referred to as speed stages) having different gear ratios (also referred to as speed ratios) γat (=AT input shaft rotation speed Ni/AT output shaft rotation speed No) is established by engaging some of the engagement devices CB. The automatic transmission 24 is configured to be able to shift into 10-speed gear stages of, for example, a first gear stage 1st to a tenth gear stage 10th. In the automatic transmission 24, the electronic control unit 90 (described later) changes the gear stage to be established, that is, selectively establishes any one of multiple gear stages, in accordance with an accelerator operation of a driver, a vehicle speed V, and the like. The AT input shaft rotation speed Ni is the rotation speed of the transmission input shaft 38, which is the input shaft rotation speed of the automatic transmission 24. The AT input shaft rotation speed Ni is the rotation speed of the output rotating member of the torque converter 22. The AT input shaft rotation speed Ni is the same value as the turbine rotation speed Nt that is the output shaft rotation speed of the torque converter 22. The AT input shaft rotation speed Ni can be expressed by the turbine rotation speed Nt. The AT output shaft rotation speed No is the rotation speed of the transmission output shaft 26, which is the output shaft rotation speed of the automatic transmission 24.

The K0 clutch 20 is a wet or dry friction engagement device made up of a multiple disc or single disc clutch that is pressed by a hydraulic actuator. The electronic control unit 90 (described later) controls the operation status of the hydraulic actuator to change the controlled status, that is, an engaged state, a released state, and the like, of the K0 clutch 20. In the K0 clutch 20, when a regulated K0 hydraulic pressure PR0 is supplied from the hydraulic control circuit 56 to the hydraulic actuator, a K0 torque Tk0 that is the torque capacity of the K0 clutch 20 is changed, with the result that the controlled status (engagement status) of the K0 clutch 20 is changed.

In the engaged state of the K0 clutch 20, the pump impeller 22a and the engine 12 are integrally rotated via the engine coupling shaft 34. In other words, when the K0 clutch 20 is engaged, the K0 clutch 20 couples the engine 12 to the drive wheels 14 such that power can be transmitted. On the other hand, in the released state of the K0 clutch 20, transmission of power between the engine 12 and the pump impeller 22a is interrupted. In other words, when the K0 clutch 20 is released, the K0 clutch 20 separates coupling between the engine 12 and the pair of drive wheels 14. Since the electric motor MG is coupled to the pump impeller 22a, the K0 clutch 20 is provided in the driveline between the engine 12 and the electric motor MG and functions as a clutch to disconnect the driveline, that is, a clutch to disconnect the engine 12 from the electric motor MG. In other words, the K0 clutch 20 is a disconnect clutch that couples the engine 12 to the electric motor MG when engaged and that separates coupling between the engine 12 and the electric motor MG when released.

In the powertrain 16, power output from the engine 12 in the case where the K0 clutch 20 is engaged is transmitted from the engine coupling shaft 34 to the drive wheels 14 sequentially via the K0 clutch 20, the electric motor coupling shaft 36, the torque converter 22, the automatic transmission 24, the propeller shaft 28, the differential gear 30, the drive shafts 32, and the like. Power output from the electric motor MG is, regardless of the controlled status of the K0 clutch 20, transmitted from the electric motor coupling shaft 36 to the drive wheels 14 sequentially via the torque converter 22, the automatic transmission 24, the propeller shaft 28, the differential gear 30, the drive shafts 32, and the like.

The vehicle 10 includes a mechanical oil pump 58 (hereinafter, MOP 58), an electric oil pump 60 (hereinafter, EOP 60), a pump motor 62, and the like. The MOP 58 is coupled to the pump impeller 22a. The MOP 58 is driven for rotation by the driving force source (the engine 12 or the electric motor MG) to discharge hydraulic fluid to be used in the powertrain 16. The pump motor 62 is a motor dedicated for the EOP 60 for driving the EOP 60 for rotation. The EOP 60 is driven for rotation by the pump motor 62 to discharge hydraulic fluid. Hydraulic fluid discharged from the MOP 58 or the EOP 60 is supplied to the hydraulic control circuit 56. The hydraulic control circuit 56 supplies the CB hydraulic pressure PRcb, the K0 hydraulic pressure PR0, the LU hydraulic pressure PRlu, and the like each regulated from hydraulic fluid discharged from at least one of the MOP 58 and the EOP 60.

The vehicle 10 further includes the electronic control unit 90 including a controller concerned with travel control or the like of the vehicle 10. The electronic control unit 90 includes a so-called microcomputer including, for example, a CPU, a RAM, a ROM, input and output interfaces, and other components. The CPU executes various control on the vehicle 10 by processing signals in accordance with programs stored in the ROM in advance while using the temporary storage function of the RAM. The electronic control unit 90 is configured to, where necessary, separately include a computer for engine control, a computer for electric motor control, a computer for hydraulic control, and the like. The electronic control unit 90 may be regarded as a controller of the disclosure.

Various signals and the like based on detected values of various sensors and the like provided in the vehicle 10 are supplied to the electronic control unit 90. The various sensors and the like provided in the vehicle 10 include, for example, an engine rotation speed sensor 70, a turbine rotation speed sensor 72, an output shaft rotation speed sensor 74, an MG rotation speed sensor 76, an accelerator operation amount sensor 78, a throttle valve opening degree sensor 80, a brake switch 82, a battery sensor 84, and a fluid temperature sensor 86. The various signals and the like include, for example, an engine rotation speed Ne, the turbine rotation speed Nt, the AT output shaft rotation speed No, an MG rotation speed Nm, an accelerator operation amount θacc, a throttle valve opening degree θth, a brake on signal Bon, a battery temperature THbat, a battery charge/discharge current Ibat, and a battery voltage Vbat of the battery 54, and a hydraulic fluid temperature THoil. The engine rotation speed Ne is the rotation speed of the engine 12. The turbine rotation speed Nt is the same value as the AT input shaft rotation speed Ni. The AT output shaft rotation speed No corresponds to the vehicle speed V. The MG rotation speed Nm is the rotation speed of the electric motor MG. The accelerator operation amount θacc is a driver's accelerator operation amount indicating the magnitude of driver's acceleration operation. The throttle valve opening degree θth is the opening degree of an electronic throttle valve. The brake on signal Bon that is a signal indicating a state where a brake pedal for activating a wheel brake is being operated by the driver. The hydraulic fluid temperature THoil is the temperature of hydraulic fluid in the hydraulic control circuit 56.

Various command signals are output from the electronic control unit 90 to devices provided in the vehicle 10. The devices include, for example, the engine controller 50, the inverter 52, the hydraulic control circuit 56, the pump motor 62, and the like. The various command signals include, for example, an engine control command signal Se, an MG control command signal Sm, a CB hydraulic control command signal Scb, a K0 hydraulic control command signal Sk0, an LU hydraulic control command signal Slu, an EOP control command signal Seop, and the like. The engine control command signal Se is used to control the engine 12. The MG control command signal Sm is used to control the electric motor MG. The CB hydraulic control command signal Scb is used to control the engagement devices CB. The K0 hydraulic control command signal Sk0 is used to control the K0 clutch 20. The LU hydraulic control command signal Slu is used to control the LU clutch 40. The EOP control command signal Seop is used to control the EOP 60.

The electronic control unit 90 includes a hybrid control unit 92 that functions as a hybrid controller, a clutch control unit 94 that functions as a clutch controller, a shift control unit 96 that functions as a shift controller, and the like to implement various control in the vehicle 10.

The hybrid control unit 92 includes the function of an engine control unit 92a, that is, an engine controller, that controls the operation of the engine 12, and the function of an electric motor control unit 92b, that is, an electric motor controller, that controls the operation of the electric motor MG via the inverter 52. The hybrid control unit 92 executes hybrid drive control or the like with the engine 12 and the electric motor MG by using the control functions.

The hybrid control unit 92 calculates a required driving amount of the vehicle 10 by the driver by, for example, applying an accelerator operation amount θacc and a vehicle speed V to the required driving amount map. The required driving amount map is a relationship obtained empirically or by design in advance and stored, that is, a relationship determined in advance. The required driving amount is, for example, a required driving torque Trdem of the drive wheels 14. The required driving torque Trdem [Nm] is a required driving power Prdem [W] at the vehicle speed V at that time from another viewpoint. A required driving force Frdem [N] in the drive wheels 14, a required AT output torque in the transmission output shaft 26, and the like are able to be used as the required driving amount. In calculating the required driving amount, an AT output shaft rotation speed No or the like may be used instead of the vehicle speed V.

The hybrid control unit 92 outputs an engine control command signal Se for controlling the engine 12 and an MG control command signal Sm for controlling the electric motor MG to achieve the required driving power Prdem in consideration of a transmission loss, an auxiliary load, the gear ratio γat of the automatic transmission 24, a chargeable power Win and dischargeable power Wout of the battery 54, and the like. The engine control command signal Se is, for example, a command value of engine power Pe that is the power of the engine 12, that is, an engine torque Te is output at the engine rotation speed Ne at that time. The MG control command signal Sm is, for example, a command value of consumption power Wm of the electric motor MG, that is, an MG torque Tm is output at the MG rotation speed Nm at that time.

The chargeable power Win of the battery 54 is an inputtable maximum power that defines the limit of input electric power of the battery 54 and indicates the input limit of the battery 54. The dischargeable power Wout of the battery 54 is an outputtable maximum power that defines the limit of output electric power of the battery 54 and indicates the output limit of the battery 54. The chargeable power Win and dischargeable power Wout of the battery 54 are calculated by the electronic control unit 90 based on, for example, a battery temperature THbat and a state of charge SOC [%] of the battery 54. A state of charge SOC of the battery 54 is a value indicating a state of charge of the battery 54 and is calculated by the electronic control unit 90 based on, for example, a battery charge/discharge current Ibat, a battery voltage Vbat, and the like.

When only the output power of the electric motor MG is sufficient to provide the required driving torque Trdem, the hybrid control unit 92 sets the drive mode to a motor drive (hereinafter, BEV drive) mode. In the BEV drive mode, the hybrid control unit 92 performs BEV driving that the vehicle 10 runs by using only the electric motor MG as a driving force source in the released state of the K0 clutch 20. On the other hand, when at least the output of the engine 12 needs to be used to sufficiently provide the required driving torque Trdem, the hybrid control unit 92 sets the drive mode to an engine drive mode, that is, a hybrid drive (hereinafter, HEV drive) mode. In the HEV drive mode, the hybrid control unit 92 performs engine driving, that is, HEV driving, that the vehicle 10 runs by using at least the engine 12 as a driving force source in the engaged state of the K0 clutch 20. On the other hand, even when only the output power of the electric motor MG is able to provide the required driving torque Trdem, but, for example, when the state of charge SOC of the battery 54 is lower than a predetermined engine start threshold or when warm-up of the engine 12 or the like is needed, the hybrid control unit 92 establishes the HEV drive mode. The engine start threshold is a predetermined threshold for determining a state of charge SOC at which the battery 54 needs to be charged by forcibly starting the engine 12. In this way, the hybrid control unit 92 switches between the BEV drive mode and the HEV drive mode by automatically stopping the engine 12 during HEV driving, restarting the engine 12 after the engine stops, or starting the engine 12 during BEV driving, based on the required driving torque Trdem and the like.

The shift control unit 96, for example, determines whether to shift the automatic transmission 24 by using a shift map that is a predetermined relationship and, where necessary, outputs a CB hydraulic control command signal Scb for executing shift control of the automatic transmission 24 to the hydraulic control circuit 56. The shift map is, for example, a predetermined relationship having shift lines for determining a shift of the automatic transmission 24 on a two-dimensional coordinate system with vehicle speed V and required driving torque Trdem as variables. In the shift map, an AT output shaft rotation speed No or the like may be used instead of a vehicle speed V, and a required driving force Frdem, an accelerator operation amount θacc, a throttle valve opening degree θth, or the like may be used instead of a required driving torque Trdem.

The hybrid control unit 92 functionally includes a start-stop control unit 92c that functions as a start-stop controller for controlling the start and stop of the engine 12. The start-stop control unit 92c may be regarded as a control unit of the disclosure.

The start-stop control unit 92c determines whether the engine 12 needs to be started during BEV driving. For example, the start-stop control unit 92c determines whether the engine 12 needs to be started based on, in the BEV drive mode, whether the required driving torque Trdem is increased to above the range in which only the MG torque Tm of the electric motor MG is able to provide the required driving torque Trdem, or whether warm-up of the engine 12 or the like is needed, or whether the state of charge SOC of the battery 54 is lower than the engine start threshold, or the like. For example, when the required MG torque Tmdem of the electric motor MG for achieving the required driving torque Trdem is greater than a preset determination threshold K during running in the BEV drive mode, the start-stop control unit 92c determines that the engine 12 needs to be started. The determination threshold K is obtained empirically or by design in advance. For example, the determination threshold K is set to a value obtained by subtracting a cranking torque Tcrk needed for cranking the engine 12 at the start of the engine from a maximum torque Tmmx outputtable from the electric motor MG.

When the start-stop control unit 92c determines that the engine 12 needs to be started, the clutch control unit 94 controls the K0 clutch 20 execute control to start the engine 12. For example, when the start-stop control unit 92c determines that the engine 12 needs to be started, the clutch control unit 94 outputs a K0 hydraulic control command signal Sk0 to the hydraulic control circuit 56 to control the K0 clutch 20 in the released state toward the engaged state such that a K0 torque Tk0 for transmitting the cranking torque Tcrk to the engine 12 side is obtained. The cranking torque Tcrk is needed to crank the engine 12 and is a torque for increasing the engine rotation speed Ne. In other words, in starting the engine 12, the clutch control unit 94 outputs a K0 hydraulic control command signal Sk0 to the hydraulic control circuit 56 to control the hydraulic actuator of the K0 clutch 20 such that the controlled status of the K0 clutch 20 is changed from the released state to the engaged state. As a result, as the K0 clutch 20 is engaged, the engine rotation speed Ne is increased to an autonomously operable rotation speed.

The start-stop control unit 92c controls the engine 12 and the electric motor MG to execute control to start the engine 12. For example, when the start-stop control unit 92c determines that the engine 12 needs to be started, the start-stop control unit 92c outputs an MG control command signal Sm to the inverter 52 for the electric motor MG to output the cranking torque Tcrk in synchronization with a change of the K0 clutch 20 into the engaged state by the clutch control unit 94. In other words, in starting the engine 12, the start-stop control unit 92c outputs an MG control command signal Sm to the inverter 52 to control the electric motor MG such that the electric motor MG outputs the cranking torque Tcrk, that is, the MG torque Tm increases by the amount of cranking torque Tcrk.

When the start-stop control unit 92c determines that the engine 12 needs to be started, the start-stop control unit 92c outputs an engine control command signal Se to the engine controller 50 to start fuel supply, engine ignition, and the like in synchronization with cranking of the engine 12 with the K0 clutch 20 and the electric motor MG. In other words, in starting the engine 12, the start-stop control unit 92c outputs an engine control command signal Se to the engine controller 50 to control the engine 12 such that the engine 12 starts operation.

During running in the HEV drive mode, when the required MG torque Tmdem of the electric motor MG for achieving the required driving torque Trdem becomes less than a preset determination threshold L, the start-stop control unit 92c determines that the engine 12 needs to be stopped. At this time, the start-stop control unit 92c releases the K0 clutch 20 and stops fuel supply to the engine 12, thus stopping the engine 12. Here, the determination threshold L is a value obtained by setting hysteresis to the determination threshold K for determining whether to start the engine 12 during BEV driving. Specifically, the determination threshold L is varied by a preset stop determination hysteresis H from the determination threshold K. In this way, with a hysteresis set between the determination threshold L and the determination threshold K, a so-called hunting that the engine 12 is frequently started and stopped is prevented.

Incidentally, for example, it is conceivable that an accelerator pedal is depressed in an extremely low vehicle speed state just before a vehicle stop as a result of steep deceleration of the vehicle 10 during running in the BEV drive mode or in a state where the vehicle 10 has decelerated to an extremely low vehicle speed as a result of deceleration of a vehicle running ahead while running on a gentle uphill road in the BEV drive mode. At this time, a higher vehicle speed-side gear stage (for example, the second gear stage 2nd or the third gear stage 3rd) than the first gear stage 1st in the automatic transmission 24, the AT input shaft rotation speed Ni of the automatic transmission 24 decreases, and the vehicle 10 is accelerated in this state. In accelerating the vehicle 10 in such a state, if the start of the engine 12 delays, it is not possible to achieve the required driving torque Trdem by using the MG torque Tm of the electric motor MG, so slow response can occur in acceleration of the vehicle 10 or backward movement of the vehicle 10 can occur on an uphill road. To prevent such situations, it is conceivable to start the engine 12 whenever the vehicle speed V falls within an extremely low vehicle speed range; while, on the other hand, the driving time of the engine 12 extends to lead to deterioration of fuel efficiency.

In contrast, the electronic control unit 90 functionally includes a determination threshold correction unit 92d that functions as a determination threshold corrector to correct the determination threshold K for determining whether to start the engine 12 during running in the BEV drive mode based on the gear stage of the automatic transmission 24 and the AT input shaft rotation speed Ni of the automatic transmission 24.

The determination threshold correction unit 92d determines a correction amount α for the determination threshold K by applying the current gear stage of the automatic transmission 24 and the AT input shaft rotation speed Ni to the relational map obtained empirically or by design in advance. Subsequently, when the determination threshold correction unit 92d determines the correction amount α for the determination threshold K, the determination threshold correction unit 92d corrects the determination threshold K such that the determination threshold K reduces by the determined correction amount a, that is, the engine 12 is more easily started. Therefore, based on the corrected determination threshold K (hereinafter, determination threshold Kcrt), the engine 12 is more easily started as compared to the determination threshold K before correction.

Figure 2:
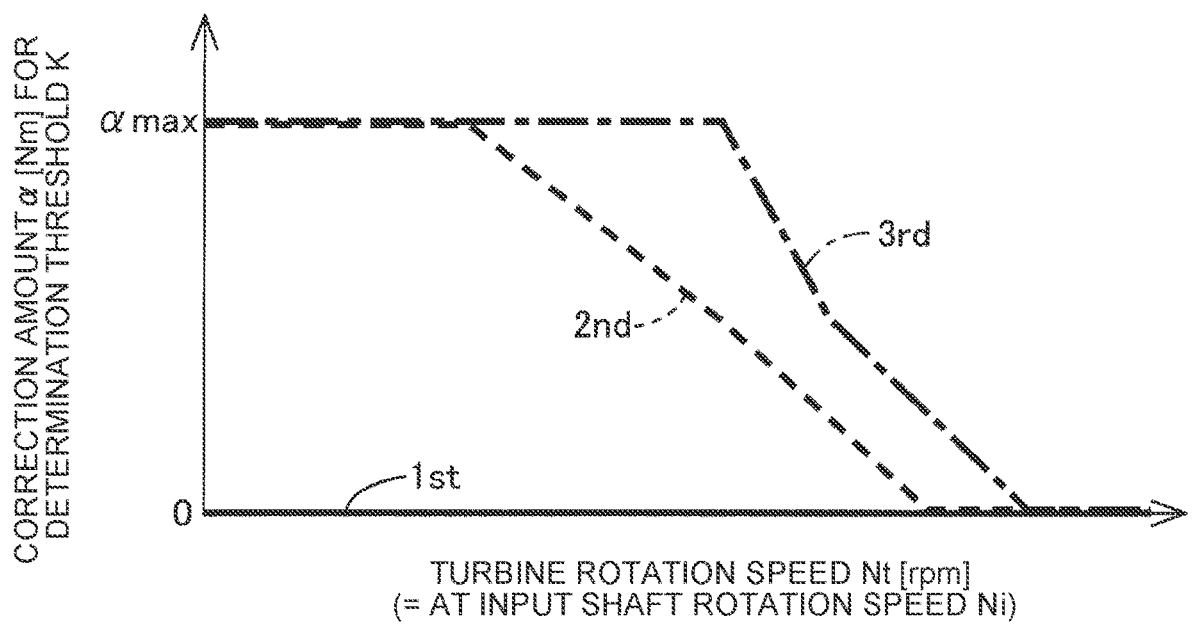
FIG. 2 is a relational map for determining a correction amount for a determination threshold based on a turbine rotation speed and a gear stage of an automatic transmission.

FIG. 2 shows one mode of the relational map for determining the correction amount α for the determination threshold K based on the turbine rotation speed Nt (that is, the AT input shaft rotation speed Ni of the automatic transmission 24) and the gear stage of the automatic transmission 24. In the relational map shown in FIG. 2, the abscissa axis represents turbine rotation speed Nt, that is, AT input shaft rotation speed Ni, and the ordinate axis represents correction amount α. In the relational map of FIG. 2, the continuous line represents the correction amount α in the first gear stage 1st, the dashed line represents the correction amount α in the second gear stage 2nd, and the alternate long and short dashed line represents the correction amount α in the third gear stage 3rd. The relational map is set in a range in which the turbine rotation speed Nt (that is, the AT input shaft rotation speed Ni) is low (for example, a range lower than 1000 rpm).

As shown in FIG. 2, in the first gear stage 1st, the correction amount α is set to zero regardless of the turbine rotation speed Nt. In other words, in the first gear stage 1st with the largest gear ratio γat, the determination threshold K is not corrected. In other words, the determination threshold K is corrected when the gear stage is a gear stage other than the first gear stage 1st with the largest gear ratio γat. In relation to this, the determination threshold K before correction is set with reference to the first gear stage 1st. Therefore, the determination threshold K before correction is set to a value with which it is possible to ensure acceleration performance required by the driver when it is determined to start the engine 12 at appropriate timing in the state of the first gear stage 1st, and backward movement of the vehicle 10 is suppressed within a possible road gradient.

In the second gear stage 2nd represented by the dashed line and the third gear stage 3rd represented by the alternate long and short dashed line, the correction amount α increases as the turbine rotation speed Nt reduces in a low rotation range of the turbine rotation speed Nt. In other words, when the turbine rotation speed Nt is low, the correction amount α is increased as compared to the case where the turbine rotation speed Nt is high. Therefore, as the turbine rotation speed Nt reduces, the determination threshold Kcrt is corrected so as to reduce. As a result, as the turbine rotation speed Nt reduces, the engine 12 is more easily started.

When the second gear stage 2nd is compared with the third gear stage 3rd, the correction amount α in the third gear stage 3rd is greater than the correction amount α in the second gear stage 2nd for the same turbine rotation speed Nt. In other words, as the gear stage of the automatic transmission 24 increases, the correction amount α is increased as compared to when the gear stage is low. Therefore, as the gear stage of the automatic transmission 24 increases, the determination threshold Kcrt is corrected so as to further reduce as compared to when the gear stage is low. As a result, as the gear stage of the automatic transmission 24 increases, the engine 12 is more easily started as compared to when the gear stage is low. In the relational map of FIG. 2, an upper limit value αmax of the correction amount α is defined, and, as the turbine rotation speed Nt becomes lower than or equal to a predetermined value, the correction amount α is set to the upper limit value αmax regardless of the turbine rotation speed Nt or the gear stage.

In the relational map, the values of the correction amount α set in the second gear stage 2nd and the third gear stage 3rd are, for example, set to values with which acceleration performance similar to that in the case of the first gear stage 1st is obtained and backward movement of the vehicle 10 is suppressed up to the range of road gradient similar to that of the first gear stage 1st. For example, due to a gear ratio difference (=γ1st−γ2nd) between the gear ratio γ1st of the first gear stage 1st and the gear ratio γ2nd of the second gear stage 2nd or a gear ratio step (=γ1st/γ2nd), the correction amount α in the second gear stage 2nd is set such that a shortage of acceleration performance with respect to acceleration operation that can be achieved in the first gear stage 1st during running in the second gear stage 2nd is compensated by the engine torque Te caused by advancing the start timing of the engine 12. Similarly, for example, due to a gear ratio difference (=γ1st−γ3rd) between the gear ratio γ1st of the first gear stage 1st and the gear ratio γ3rd of the third gear stage 3rd or a gear ratio step (=γ1st/γ3rd), the correction amount α in the third gear stage 3rd is set such that a shortage of acceleration performance with respect to acceleration operation that can be achieved in the first gear stage 1st during running in the third gear stage 3rd is compensated by the engine torque Te caused by advancing the start timing of the engine 12.

For example, with a change in correction amount α due to output of an upshift command from the second gear stage 2nd to the third gear stage 3rd, the determination threshold K is changed and it is, for example, determined whether to start the engine 12. Thus, the correction amount α is set such that a phenomenon (that is, hunting) that start and stop of the engine 12 are repeated is prevented. In addition, for example, when the state of charge SOC of the battery 54 becomes low and the dischargeable power Wout is limited, the correction amount α is set such that repetition (that is, hunting) of start and stop of the engine 12, the engine 12 is more easily started, with the result that the correction amount α is set such that repetition (that is, hunting) of start and stop of the engine 12 does not occur.

Since the correction amount α is set as described above, the engine 12 is more easily started as the gear stage is a higher speed-side gear stage than the first gear stage 1st and the turbine rotation speed Nt reduces. Therefore, acceleration performance similar to that in the case of the first gear stage is obtained, and backward movement of the vehicle 10 is suppressed within the range of the same road gradient as that in the case of the first gear stage 1st.

Figure 3:
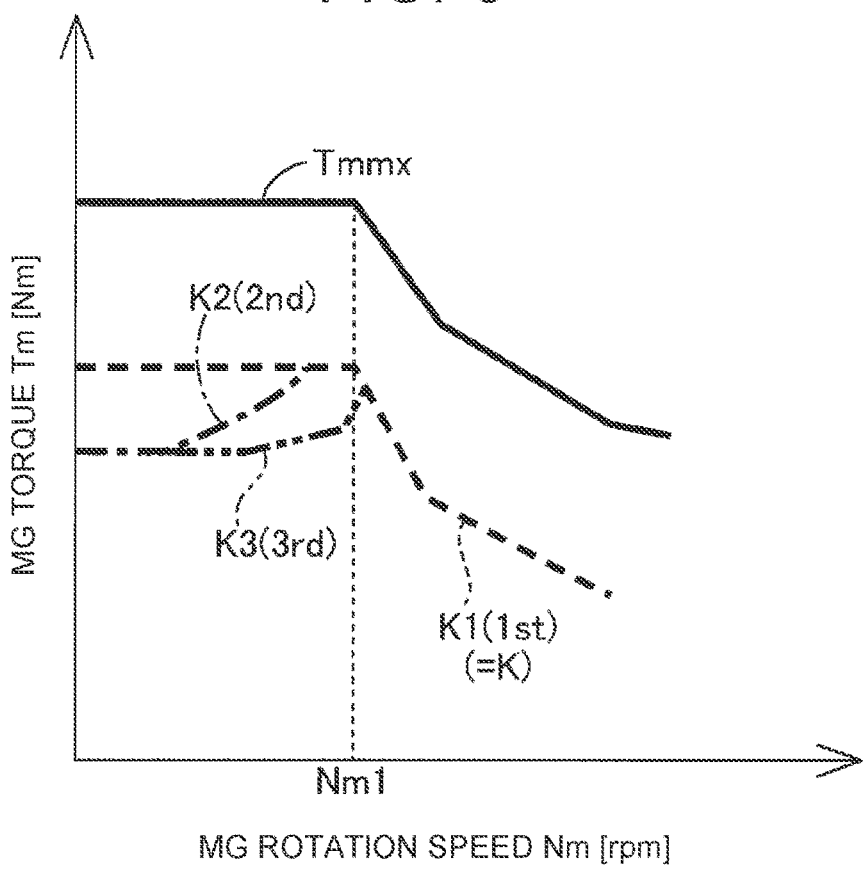
FIG. 3 is a graph showing a determination threshold for determining whether to start an engine, corrected based on the relational map of FIG. 2.

FIG. 3 is a graph showing one mode of the determination threshold K for determining whether to start the engine 12, corrected based on the relational map of FIG. 2. In FIG. 3, the abscissa axis represents the MG rotation speed Nm of the electric motor MG, and the ordinate axis represents the MG torque Tm of the electric motor MG. In FIG. 3, the MG torque Tm of the electric motor MG, represented by the continuous line, represents maximum torque Tmmx that the electric motor MG is able to output. A determination threshold K1 represented by the dashed line is a determination threshold K1 set during BEV driving in the first gear stage 1st. In other words, the determination threshold K1 represents the determination threshold K before correction. A determination threshold K2 represented by the alternate long and short dashed line is a determination threshold K2 set during BEV driving in the second gear stage 2nd. A determination threshold K3 represented by the alternate long and two-short dashed line is a determination threshold K3 set during BEV driving in the third gear stage 3rd. On the higher rotation speed side than a predetermined rotation speed Nm1 at which the maximum torque Tmmx begins to reduce, the determination threshold K2 and the determination threshold K3 are set to the same value as the determination threshold K1 in the first gear stage 1st and represented by the dashed line.

In FIG. 3, the determination threshold K1 is set to a value obtained by subtracting the cranking torque Tcrk needed at the start of the engine 12 from the maximum torque Tmmx of the electric motor MG. Thus, the MG torque Tm for the cranking torque Tcrk used at the start of the engine is ensured, so a reduction in driving force for propelling the vehicle 10 is prevented at the start of the engine. The determination threshold K2 in the second gear stage 2nd represented by the alternate long and short dashed line and the determination threshold K3 in the third gear stage 3rd represented by the alternate long and two-short dashed line are values smaller than the determination threshold K1 in the first gear stage 1st represented by the dashed line. In other words, the determination threshold K1 in the first gear stage 1st is corrected from the determination threshold K1 by the correction amount α obtained by the above-described relational map of FIG. 2, with the result that the determination thresholds K2, K3 are corrected so as to be lower than the determination threshold K1. Thus, when the MG rotation speed Nm is low and during BEV driving in the second gear stage 2nd or the third gear stage 3rd, the MG torque Tm tends to exceed the determination threshold K2 or the determination threshold K3, so the engine is started earlier than during BEV driving in the first gear stage 1st. As a result, the start timing of the engine 12 is advanced, acceleration response equivalent to that in the case of the first gear stage 1st is obtained, and backward movement of the vehicle 10 is suppressed.

The determination threshold correction unit 92d sets the determination threshold L for determining whether to stop the engine 12 during HEV driving. The determination threshold correction unit 92d converts the determination threshold K to the determination threshold L for determining whether to stop the engine 12 during BEV driving by adding or subtracting a preset stop determination hysteresis H to or from the determination threshold K for determining whether to start the engine 12 during BEV driving. Thus, the determination threshold L is set to a value varied by the stop determination hysteresis H from the determination threshold K.

Figure 4:
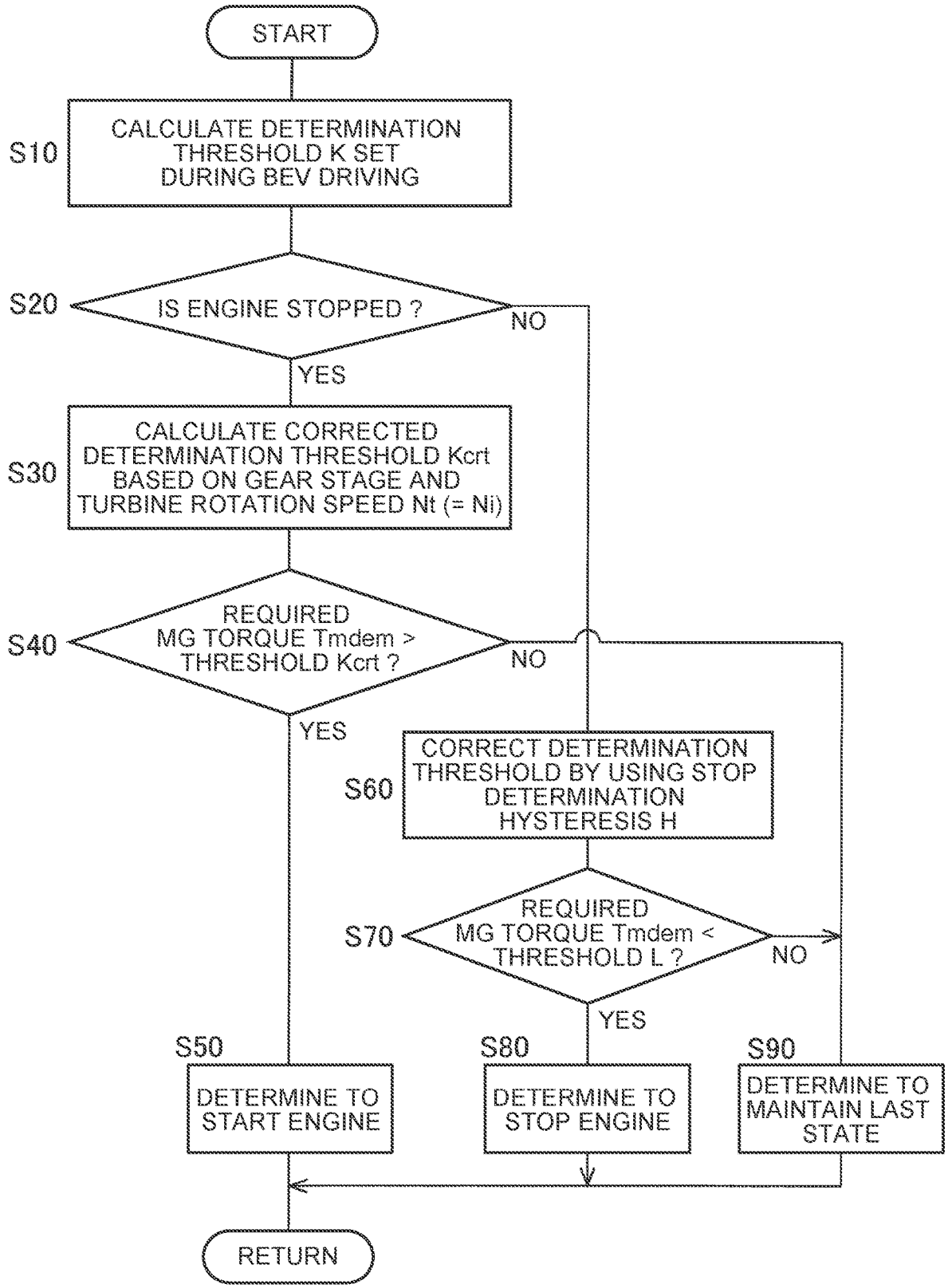
FIG. 4 is a flowchart for illustrating a relevant part of control operations of an electronic control unit.

FIG. 4 is a flowchart for illustrating a relevant part of control operations of the electronic control unit 90 and is a flowchart for illustrating control operations for setting the engine start determination threshold K with which backward movement of the vehicle 10 and slow response of acceleration at the time when the accelerator pedal is depressed in an extremely low vehicle speed range are suppressed. This flowchart is repeatedly executed while the vehicle 10 is running.

Initially, in step (hereinafter, step is omitted) S10 corresponding to the control function of the start-stop control unit 92c, a determination threshold K for determining whether to start the engine 12, set during BEV driving is obtained. The determination threshold K substantially corresponds to the determination threshold K1 set in the first gear stage 1st. Subsequently, in S20 corresponding to the control function of the start-stop control unit 92c, it is determined whether the engine 12 is in a stopped state. When the determination of S20 is affirmative, the correction amount α is obtained based on the gear stage of the automatic transmission 24 and the turbine rotation speed Nt (that is, the AT input shaft rotation speed Ni) in S30 corresponding to the control function of the determination threshold correction unit 92d. In addition, the determination threshold K is calculated (corrected) based on the obtained correction amount α. After that, in S40 corresponding to the control function of the start-stop control unit 92c, it is determined whether the required MG torque Tmdem of the electric motor MG is greater than the corrected determination threshold Kcrt. When the determination of S40 is affirmative, it is determined that the engine 12 needs to be started in S50 corresponding to the control function of the start-stop control unit 92c, and control to start the engine 12 is executed. On the other hand, when the determination of S40 is negative, the engine 12 is maintained in the same state (here, engine stopped state) as that at the time of the last determination in S90 corresponding to the control function of the hybrid control unit 92.

When the determination of S20 is negative, the determination threshold K obtained in S10 is corrected by using the stop determination hysteresis H to obtain a determination threshold L for determining whether to stop the engine 12 in S60 corresponding to the control function of the determination threshold correction unit 92d. Then, in S70 corresponding to the control function of the start-stop control unit 92c, it is determined whether the required MG torque Tmdem of the electric motor MG is less than the determination threshold L obtained in S60. When the determination of S70 is affirmative, it is determined that the engine 12 needs to be stopped in S80 corresponding to the control function of the start-stop control unit 92c, and control to stop the engine 12 is executed. On the other hand, when the determination of S70 is negative, the engine 12 is maintained in the same state (here, engine driving state) as that at the time of the last determination in S90.

As described above, according to the present embodiment, during BEV driving that the vehicle 10 is caused to run by using the power of the electric motor MG, the determination threshold K for determining whether to start the engine 12 is corrected by estimating a shortage of driving force in advance based on the gear stage of the automatic transmission 24 and the turbine rotation speed Nt (that is, the AT input shaft rotation speed Ni of the automatic transmission 24). Therefore, the engine is started at appropriate timing for a change in required MG torque Tmdem, with the result that a shortage of driving force of the vehicle 10 is suppressed. As a result, backward movement or slow response of acceleration of the vehicle 10 due to a shortage of driving force of the vehicle 10 is suppressed.

According to the present embodiment, the determination threshold K is corrected in a gear stage other than the first gear stage 1st with the largest gear ratio γat. Therefore, occurrence of a shortage of driving force in the second gear stage 2nd or the third gear stage 3rd with a smaller gear ratio γat than the first gear stage 1st is estimated in advance, and the engine 12 is started at appropriate timing, with the result that a shortage of driving force is suppressed. The determination threshold K is corrected so as to reduce as the AT input shaft rotation speed Ni of the automatic transmission 24 reduces. Therefore, for a situation in which a shortage of driving force tends to occur as the AT input shaft rotation speed Ni of the automatic transmission 24 reduces, the engine is more easily started early, with the result that a shortage of driving force is suppressed. The determination threshold K is corrected so as to reduce as the gear stage of the automatic transmission 24 increases as compared to when the gear stage is low. Therefore, for a situation in which a shortage of driving force tends to occur as the gear stage increases, the engine is more easily started early, with the result that a shortage of driving force is suppressed.

The embodiment of the disclosure has been described in detail with reference the drawings; however, the disclosure is also applicable to other embodiments.

For example, in the above-described embodiment, the correction amount α is changed based on the turbine rotation speed Nt, that is, the AT input shaft rotation speed Ni; however, the disclosure is not necessarily limited to the AT input shaft rotation speed Ni. As long as it is a value related to the AT input shaft rotation speed Ni, such as a vehicle speed V, the disclosure is able to be applied as needed.

In the above-described embodiment, the automatic transmission 24 is a step transmission configured to include a set or multiple sets of planetary gear trains and a plurality of engagement devices CB; however, the disclosure is not necessarily limited to the above-described configuration of the automatic transmission 24. The disclosure is able to be applied as needed as long as a transmission is able to be shifted into multiple gear stages.

In the above-described embodiment, the determination threshold K is corrected while the automatic transmission 24 is in the second gear stage 2nd or the third gear stage 3rd. Alternatively, the determination threshold K may be corrected only in, for example, the second gear stage 2nd. Alternatively, the determination threshold K may be corrected also in a gear stage larger than or equal to the fourth gear stage 4th. However, correction of the determination threshold K is limited to a gear stage established in a low vehicle speed range lower than a vehicle speed range in which the automatic transmission 24 is shifted.

The above-described embodiment is only illustrative. The disclosure may be implemented in modes including various modifications or improvements based on the knowledge of persons skilled in the art.

What is claimed is:

1. A controller for a hybrid electric vehicle that includes an engine and an electric motor functioning as a driving force source for propelling the hybrid electric vehicle, and a transmission inserted in a driveline between a drive wheel and each of the engine and the electric motor, the controller comprising a control unit configured to start the engine when a required torque of the electric motor becomes greater than a preset determination threshold during motor running that the hybrid electric vehicle is caused to run by using power output from the electric motor, wherein the transmission includes a plurality of gear stages and the determination threshold is configured to be corrected based on the gear stage of the transmission and an input shaft rotation speed of an input shaft of the transmission or a value related to the input shaft rotation speed such that the determination threshold is one of a plurality of determination thresholds that are different from one another and each individually corresponding with the plurality of gear stages.

2. The controller according to claim 1, wherein the determination threshold is corrected when the gear stage is a gear stage other than a gear stage with a largest gear ratio of the transmission.

3. The controller according to claim 1, wherein the determination threshold is corrected so as to reduce as the input shaft rotation speed of the transmission or the value related to the input shaft rotation speed reduces.

4. The controller according to claim 1, wherein the determination threshold is corrected so as to reduce as the gear stage of the transmission increases as compared to when the gear stage is low.

* * * * *